US012782551B2

(12) United States Patent
Zhang et al.

(10) Patent No.: US 12,782,551 B2
(45) Date of Patent: Nov. 3, 2026

(54) HIGH PRECISION GEOCODING METHOD FOR GROUND-BASED SYNTHETIC APERTURE RADAR IMAGE

(71) Applicants: China Academy of Safety Science and Technology, Beijing (CN); Jiangxi Academy of Emergency Management Science, Nanchang City (CN)

(72) Inventors: Hao Zhang, Beijing (CN); Xiaolin Yang, Beijing (CN); Haitao Ma, Beijing (CN); Tonglin Huang, Jiangxi Province (CN); Zhengxing Yu, Beijing (CN); Guishi Rao, Jiangxi Province (CN)

(73) Assignees: China Academy of Safety Science and Technology, Beijing (CN); Jiangxi Academy of Emergency Management Science, Jiangxi Province (CN)

( * ) Notice: Subject to any disclaimer, the term of this patent is extended or adjusted under 35 U.S.C. 154(b) by 202 days.

(21) Appl. No.: 18/806,015

(22) Filed: Aug. 15, 2024

(65) Prior Publication Data

US 2025/0327919 A1 Oct. 23, 2025

(30) Foreign Application Priority Data

Apr. 18, 2024 (CN) ......................... 202410472246.2

(51) Int. Cl.
*G01S 13/90* (2006.01)
*G01S 13/88* (2006.01)

(52) U.S. Cl.
CPC ........ *G01S 13/9023* (2013.01); *G01S 13/885* (2013.01)

(58) Field of Classification Search
None
See application file for complete search history.

(56) References Cited

U.S. PATENT DOCUMENTS

2007/0253639 A1* 11/2007 Statter, Jr. ............. G01S 13/867 382/276
2012/0319893 A1* 12/2012 Yun ..................... G01S 13/9023 342/25 C
2016/0320479 A1* 11/2016 Ma ...................... G01S 13/9023

FOREIGN PATENT DOCUMENTS

CN 108983232 A * 12/2018 ............. G01S 13/90
CN 116359920 A * 6/2023 ............. G01S 13/90
EP 2413158 A1 * 2/2012 ............. G01S 13/90

OTHER PUBLICATIONS

Y. Wang et al., "Ground-Based Differential Interferometry SAR: A Review," in IEEE Geoscience and Remote Sensing Magazine, vol. 8, No. 1, pp. 43-70, Mar. 2020, doi: 10.1109/MGRS.2019.2963169. (Year: 2020).*

* cited by examiner

*Primary Examiner* — Bernarr E Gregory
(74) *Attorney, Agent, or Firm* — Shih IP Law Group, PLLC

(57) ABSTRACT

A high precision geocoding method for a ground-based synthetic aperture radar image is provided, which relates to the technical field of ground-based synthetic aperture radar data processing. Geometric mapping registration is performed on radar two-dimensional imaging information and topographic data in a monitoring area to achieve mutual transformation between a two-dimensional polar coordinate system of radar and a spatial three-dimensional point cloud coordinate system and determine spatial position information of deformation of a unique side slope ground object target in a radar resolution unit. Moreover, radar time sequence deformation data may be converted into information of deformation along a major sliding direction of the side slope by determining projection transformation parameters of a side slope sliding vector and a line-of-sight direction vector.

8 Claims, 3 Drawing Sheets

HIGH PRECISION GEOCODING METHOD FOR GROUND-BASED SYNTHETIC APERTURE RADAR IMAGE

CROSS-REFERENCE TO RELATED APPLICATION

This patent application claims the benefit and priority of Chinese Patent Application No. 202410472246.2 filed with the China National Intellectual Property Administration on Apr. 18, 2024, the disclosure of which is incorporated by reference herein in its entirety as part of the present application.

TECHNICAL FIELD

The present disclosure relates to the technical field of ground-based synthetic aperture radar data processing, and in particular, to a high precision geocoding method for a ground-based synthetic aperture radar image.

BACKGROUND

Using ground-based interferometric synthetic aperture radar based on a principle of microwave remote sensing interferometry, a landslide hidden peril area with a risk of instability is quickly recognized and positioned by monitoring and learning deformation and displacement situations of a side slop rock in long distance, large range, and near real-time all day and all weather. And then a deformation stage of a side slope is analyzed according to a classical and empirical early warning and forecasting model, and an early warning level and forecasting information are formulated pointedly, so as to provide scientific basis for correct analysis, evaluation, monitoring, early warning, and treatment of a landslide.

Geocoding is an important technical link in application of monitoring radar time sequence deformation data. Geometric mapping and three-dimensional matching are performed on radar imaging information and topographic and geographic data, which contributes to carry out three-dimensional visualization of monitoring results of radar, analysis of imaging geometric ground object features, comparison and verification of multivariate monitoring means, and the like. It is of great significance to connect a two-dimensional polar coordinate system of the radar and a spatial point cloud reference coordinate system, which not only facilitating improving accuracy of recognizing a side slope hidden peril deformation body, but also facilitates long-term trend deformation monitoring, integration of multivariate monitoring means, and direct or indirect transformation and application of the monitoring results.

In addition, the radar can only obtain deformation information in a line-of-sight direction of target radar, that is, a projection component of a real deformation quantity of a target area in a radar line-of-sight direction, which essentially belongs to a category of a one-dimensional measurement technology. During practical application and monitoring, it is inevitable to lead to low adaptability between initial deformation data and classical and empirical early warning and forecasting models such as a Saito method and a speed reciprocal method due to an incident angle.

SUMMARY

To solve above problems in a prior art, the present disclosure provides a high precision geocoding method for a ground-based synthetic aperture radar image.

To achieve the above objective, the present disclosure provides the following solutions:

A high precision geocoding method for a ground-based synthetic aperture radar image includes:

obtaining a Single Look Complex (SLC) image of a monitoring area in a two-dimensional plane coordinate system, and dividing the SLC image in the two-dimensional plane coordinate system into a plurality of radar resolution units according to radar range resolution and radar azimuth resolution;

determining a radar line-of-sight direction vector, a slant range between a target and a radar, and a normalized vector in a horizontal direction of the radar according to spatial point cloud information of a side slope ground object target and a radar rectilinear orbit, and determining a reference plane normal vector according to a spatial geometric mapping relationship;

determining a coordinate parameter of a ground object point cloud target in a two-dimensional coordinate system of the radar based on the radar line-of-sight direction vector, the normalized vector in the horizontal direction of the radar, and the reference plane normal vector;

determining an angular coordinate in a radar polar coordinate system based on the coordinate parameter of the ground object point cloud target in the two-dimensional coordinate system of the radar;

determining a coordinate of the ground object point cloud target in the radar polar coordinate system based on the angular coordinate in the radar polar coordinate system and the slant range between the target and the radar;

obtaining ground object point cloud data based on the coordinate parameter of the ground object point cloud target in the two-dimensional coordinate system of the radar and the coordinate of the ground object point cloud target in the radar polar coordinate system;

screening the ground object point cloud data in a radar monitoring range according to actual monitoring parameters of the radar to determine a unique ground object point cloud target of a radar resolution unit, where the actual monitoring parameters of the radar includes a maximum monitoring range, a minimum monitoring range, a maximum sine azimuth angle, and a minimum sine azimuth angle;

performing radar resolution unit plane fitting and determining a plane normal vector based on the unique ground object point cloud target of the radar resolution unit;

determining a vector of intersection line of a fitted plane and a plane in a same spatial reference system;

determining a side slope sliding vector of each radar resolution unit based on the plane normal vector and the vector of the intersection line;

determining a projection transformation parameter of each radar resolution unit based on the radar line-of-sight direction vector and the side slope sliding vector;

determining a displacement component along a direction of the side slope sliding vector in each radar resolution unit based on the projection transformation parameter of each radar resolution unit and radar time sequence deformation data; and setting the displacement component along the direction of the side slope sliding vector in each radar resolution unit as pre-processed ground-based interferometric synthetic aperture radar deformation data.

In an embodiment, the coordinate parameter of the ground object point cloud target in the two-dimensional coordinate system of the radar is expressed as $(x_P, y_P)$, where $x_P=\langle OP, L_x\rangle$ and $y_P=\langle OP, L_y\rangle$; $x_P$ denotes an x-coordinate of the ground object point cloud target in the two-dimensional coordinate system of the radar, $y_P$ denotes a y-coordinate of the ground object point cloud target in the two-dimensional coordinate system of the radar, OP denotes the radar line-of-sight direction vector, $L_x$ denotes the normalized vector in the horizontal direction of the radar, and $L_y$ denotes the reference plane normal vector.

In an embodiment, the angular coordinate in the radar polar coordinate system is expressed as θ, $$\theta=\begin{cases}\arctan\frac{x_P}{y_P}, & y_P\neq 0\\ 0, & y_P=0\end{cases}$$

In an embodiment, the screening the ground object point cloud data in a radar monitoring range according to actual monitoring parameters of the radar to determine a unique ground object point cloud target of a radar resolution unit includes:

- determining whether each radar resolution unit only contains one piece of ground object point cloud data;
- in a case that each radar resolution unit only contains one piece of ground object point cloud data, setting the ground object point cloud data as the unique ground object point cloud target; and
- in a case that each radar resolution unit contains a plurality of pieces of ground object point cloud data, setting an average value of the plurality of pieces of ground object point cloud data as the unique ground object point cloud target.

In an embodiment, the vector of intersection line is expressed as $$L_m^n,$$

$$L_m^n = P_m^n \cap P_{XOY},$$

where $$P_m^n$$

denotes a plane fitted with the ground object point cloud data corresponding to a radar resolution unit (m, n) as a center, and $P_{XOY}$ denotes an XOY plane that is located in a same spatial reference coordinate system as the fitted plane.

In an embodiment, the side slope sliding vector is expressed as $$S_m^n,$$

$$S_m^n = I_m^n \times L_m^n,$$

where $$I_m^n$$

denotes a normal vector of a plane $$P_m^n.$$

In an embodiment, the projection transformation parameter is expressed as $$\gamma_m^n,$$

$$\gamma_m^n = \frac{\langle OP, S_m^n\rangle}{|OP|\cdot|S_m^n|},$$

where OP denotes the radar line-of-sight direction vector.

In an embodiment, the displacement component along the direction of the side slope sliding vector in the radar resolution unit is expressed as $$dis_m^n,$$

$$dis_m^n = \gamma_m^n \times diff_m^n,$$

where $$diff_m^n$$

denotes the radar time sequence deformation data.

According to specific embodiments provided in the present disclosure, the present disclosure discloses the following technical effects:

Geometric mapping registration is performed on radar two-dimensional imaging information and topographic data in a monitoring area to achieve mutual transformation between a two-dimensional polar coordinate system of radar and a spatial three-dimensional point cloud coordinate system and determine spatial position information of deformation of a unique side slope ground object target in a radar resolution unit, which can more intuitively and clearly reflect a deformation development situation in the monitoring area of a side slope. Moreover, in the present disclosure, the radar time sequence deformation data may be converted into information of deformation along a major sliding direction of the side slope by determining projection transformation parameters of a side slope sliding vector and a line-of-sight direction vector, which further enhances the adaptability of monitoring data to an early warning and forecasting model, thereby facilitating improving the accuracy of recognizing a side slope hidden peril deformation body and improving the work efficiency of a ground-based interferometric synthetic aperture radar monitoring and early warning system.

BRIEF DESCRIPTION OF THE DRAWINGS

To describe technical solutions in embodiments of the present disclosure or in the conventional art more clearly, the following briefly describes the accompanying drawings required for describing the embodiments. Apparently, the accompanying drawings in the following description are merely some embodiments of the present disclosure, and those of ordinary skill in the art may obtain other drawings from these accompanying drawings without creative work.

DETAILED DESCRIPTION OF THE EMBODIMENTS

Technical solutions in embodiments of the present disclosure will be clearly and completely described below with reference to the drawings in the embodiments of the present disclosure. Apparently, the described embodiments are merely part rather than all of the embodiments of the present disclosure. On the basis of the embodiments in the present disclosure, all other embodiments obtained by those of ordinary skill in the art without creative work fall within the scope of protection of the present disclosure.

An objective of the present disclosure is to provide a high precision geocoding method for a ground-based synthetic aperture radar image, which aims to convert radar time sequence deformation data into information of deformation along a major sliding direction of a side slope, and further enhances the adaptability of monitoring data to an early warning and forecasting model.

To make above objective, features, and advantages of the present disclosure more apparent and more comprehensible, the present disclosure is further described in detail below with reference to accompanying drawings and specific implementations.

Embodiment 1

Figure 1:
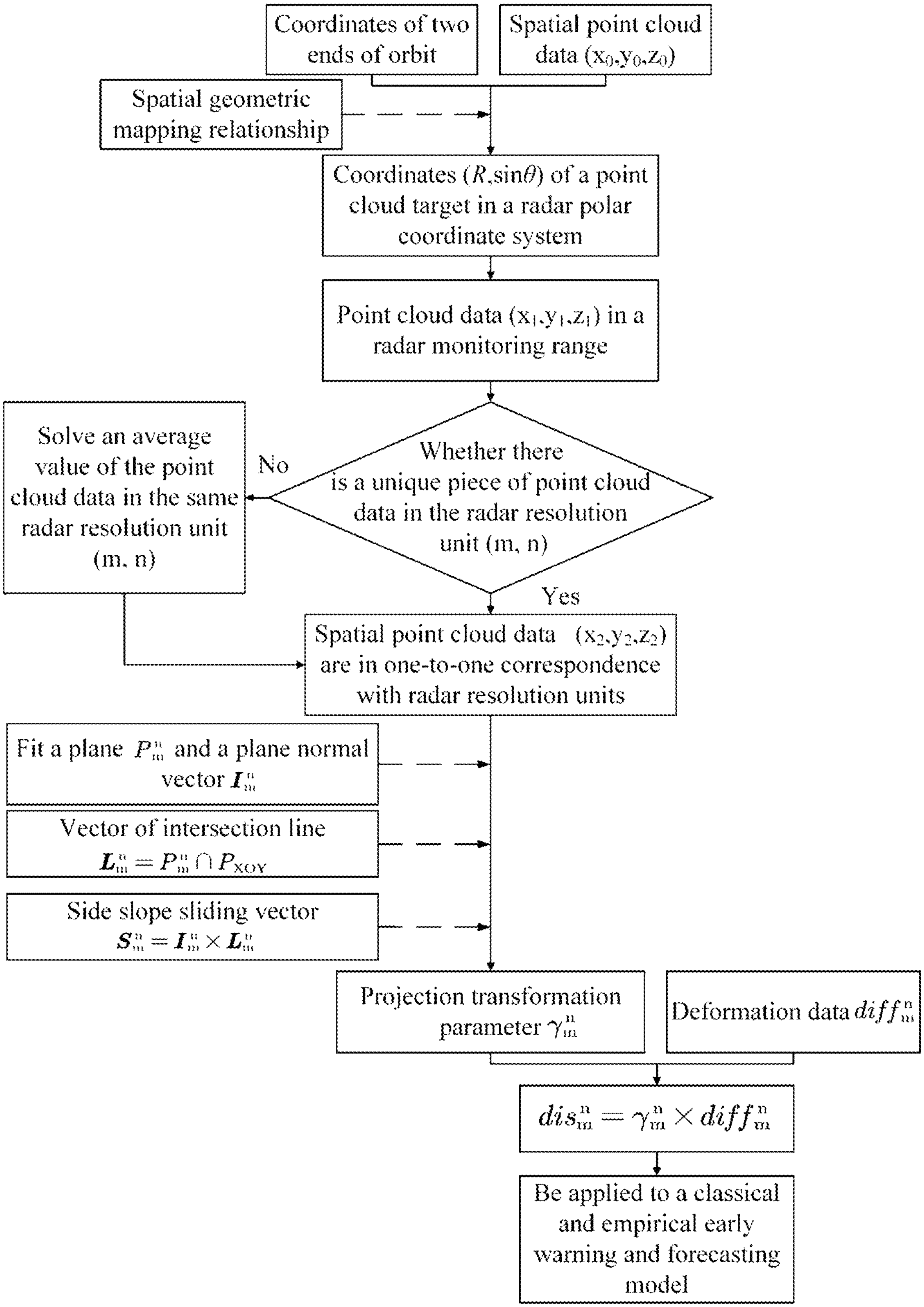
FIG. 1 is a flowchart of a high precision geocoding method for a ground-based synthetic aperture radar image according to an embodiment of the present disclosure.
Figure 2:
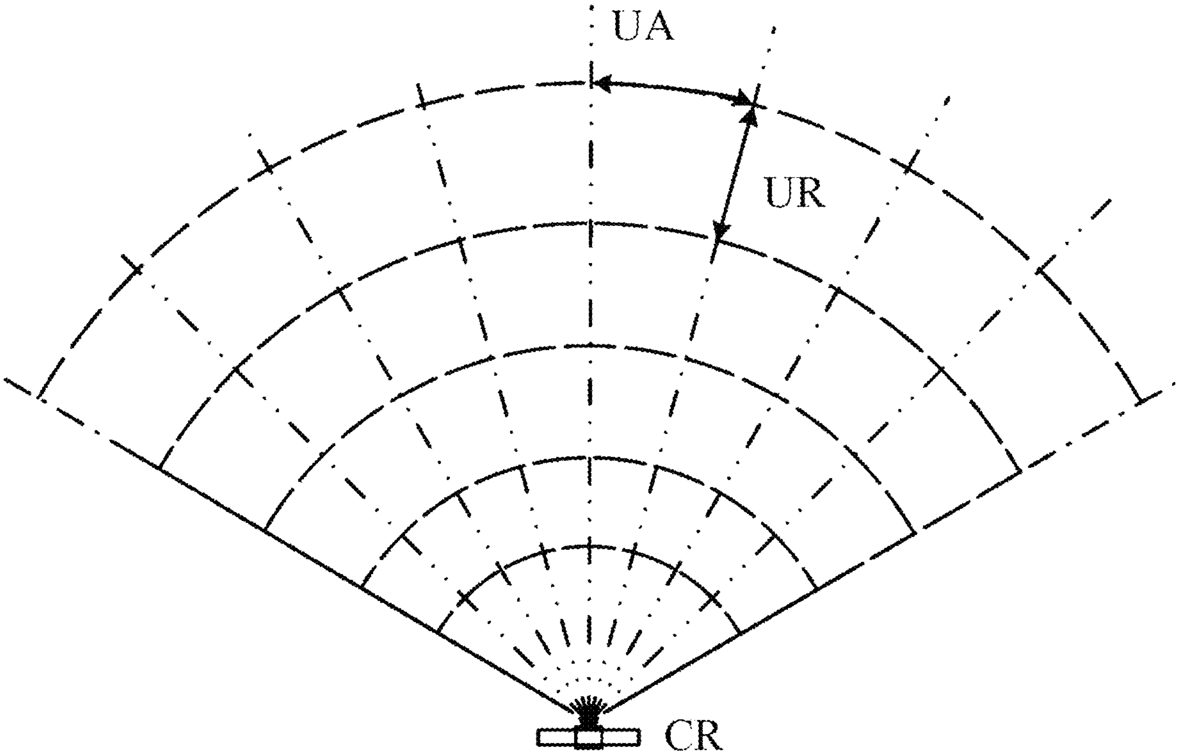
FIG. 2 is a schematic diagram showing radar resolution unit dividing and high precision geocoding results according to an embodiment of the present disclosure.

The present embodiment provides a high precision geocoding method for a ground-based synthetic aperture radar image. In this method, used spatial point cloud information includes three-dimensional coordinate information of a radar rectilinear orbit and a ground object target in a side slope monitoring range in the same spatial reference system. Radar may directly obtain a single look complex (SLC) image of a monitoring area in a two-dimensional plane coordinate system. Used image geometry is to distinguish different ground object targets based on a slant range R from a target to an equivalent phase center of the radar and an angle θ deviating from a center line of a radar antenna beam. As shown in FIG. 2, the overall monitoring area may be divided into m Xn radar resolution units according to radar range resolution and radar azimuth resolution. On this basis, as shown in FIG. 1, the method includes steps 1 to 9.

In step 1: A radar line-of-sight direction vector OP, a slant range R between the target and the radar, and a normalized vector $L_x$ in a horizontal direction of the radar are determined according to spatial point cloud information of a side slope ground object target $(x_0, y_0, z_0)$ and a radar rectilinear orbit, and a reference plane normal vector $L_y$ is determined according to a spatial geometric mapping relationship. Therefore, a coordinate parameter $(I_P, y_P)$ of a ground object point cloud target in a two-dimensional coordinate system of the radar may be obtained, where $x_P=\langle OP, L_x\rangle$ and $y_P=\langle OP, L_y\rangle$, $\langle a, b\rangle=a\cdot b$, where a is the radar line-of-sight direction vector OP, and b is the normalized vector $L_x$ in the horizontal direction of the radar or the reference plane normal vector $L_y$.

In step 2: An angular coordinate in a radar polar coordinate system is determined based on the coordinate parameter $(x_P, y_P)$ of the ground object point cloud target in the two-dimensional coordinate system of the radar. The angular coordinate in the radar polar coordinate system is an angle deviating from a center line of a radar antenna beam, and is expressed as θ:

$$\theta=\begin{cases}\arctan\frac{x_P}{y_P}, & y_P\neq 0\\ 0, & y_P=0\end{cases}.$$

Finally, a coordinate (R,sin θ) of the ground object point cloud target in the radar polar coordinate system may be determined.

In step 3: Ground object point cloud data $(x_1, y_1, z_1)$ in a radar monitoring range is screened according to actual monitoring parameters of the radar, where the actual monitoring parameters of the radar include a maximum monitoring range $R_{max}$, a minimum monitoring range $R_{min}$, a maximum sine azimuth angle $\sin\theta_{max}$, and a minimum sine azimuth angle $\sin\theta_{min}$.

In step 4: A unique ground object point cloud target is determined in a radar resolution unit (m, n). An essence of this step is to determine whether there is a unique piece of point cloud data in the radar resolution unit (m, n). In a case that there are multiple point cloud targets in the radar resolution unit (m, n), the unique ground object point cloud target is determined by solving an average value. In a case that there is unique point cloud data in the radar resolution unit (m, n), it indicates that the spatial point cloud data $(x_2, y_2, z_2)$ are in one-to-one correspondence with the radar resolution unit (m, n).

In step 5: A plane $$P_m^n$$

is fitted in the radar resolution unit (m, n) and a plane normal vector $$I_m^n$$

is solved according to a slope surface smoothness parameter.

In step 6: A vector $$L_m^n$$

of intersection line of the plane $$P_m^n$$

of the radar resolution unit (m, n) and a plane $P_{XOY}$ in the same spatial reference system is determined, that is:

$$L_m^n = P_m^n \cap P_{XOY}.$$

In step 7: A side slope sliding vector $$S_m^n$$

of the radar resolution unit (m,n) is determined, that is:

$$S_m^n = I_m^n \times L_m^n.$$

Figure 3:
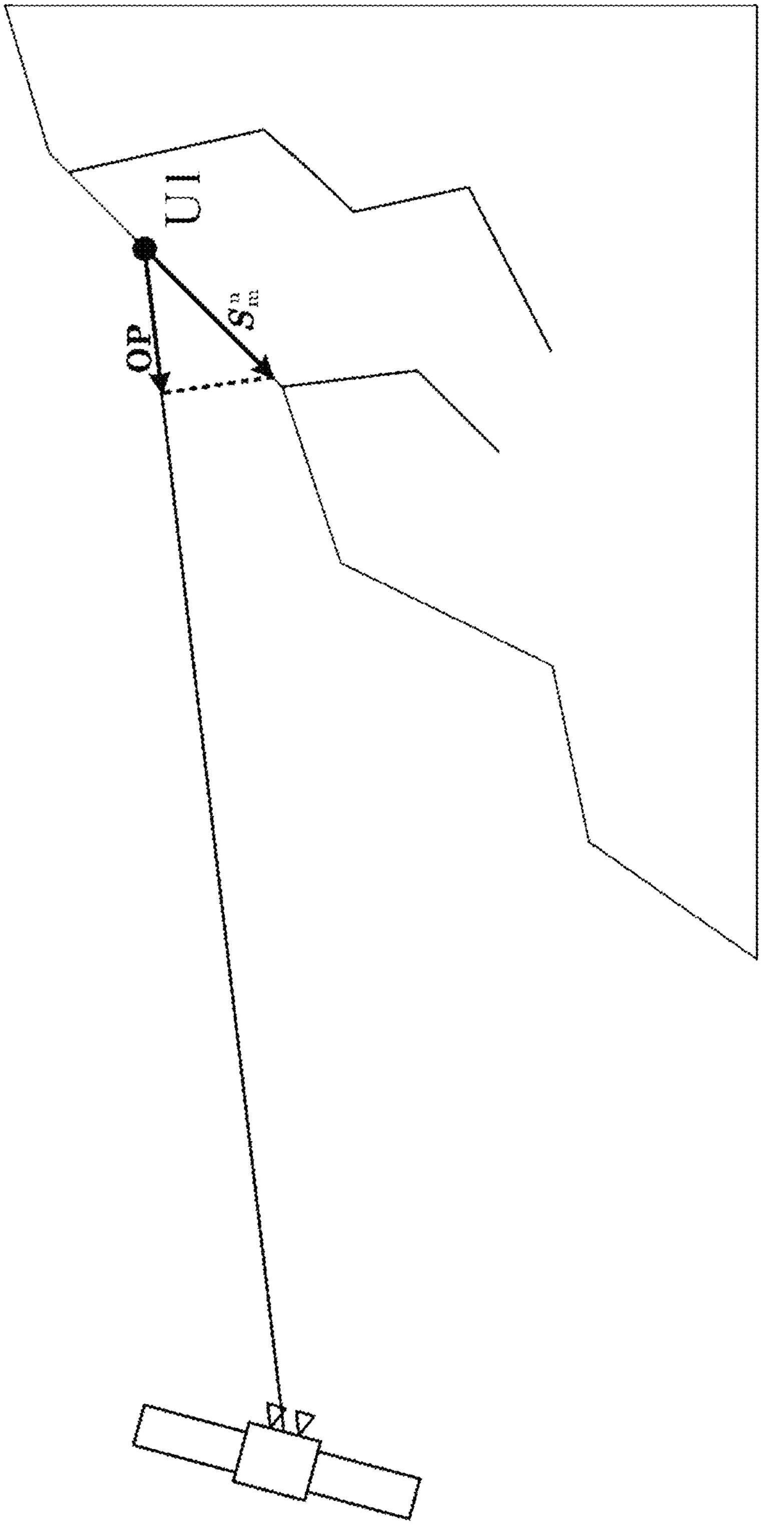
FIG. 3 is a schematic diagram of deformation data projection transformation according to an embodiment of the present disclosure.

A schematic principle of deformation data projection transformation is shown in FIG. 3.

In step 8: A projection transformation parameter $$\gamma_m^n$$

of the radar resolution unit (m, n) is determined, that is:

$$\gamma_m^n = \frac{\langle OP, S_m^n \rangle}{|OP| \cdot |S_m^n|}.$$

In step 9: A displacement component $$dis_m^n$$

along a side slope sliding vector direction in the radar resolution unit (m, n) is determined according to radar time sequence deformation data, that is:

$$dis_m^n = \gamma_m^n \times diff_m^n.$$

$$diff_m^n$$

denotes the radar time sequence deformation data, that is, deformation data corresponding to the radar resolution unit (m, n).

Now the displacement component $$dis_m^n$$

along the side slope sliding vector direction in the radar resolution unit (m, n) may be applied to a classical and empirical early warning and forecasting model.

Characteristic data of two-dimensional image of a ground-based interferometric synthetic aperture radar includes a side slope deformation area and deformation data. Characteristic data of the spatial point cloud information includes high precision spatial three-dimensional coordinates, and elevation information is "discarded" when the spatial point cloud information of the side slope ground object target is projected on a two-dimensional slant range plane of a radar image. Therefore, methods for matching features such as points, lines (edges), and areas (planes) according to a traditional registration idea are difficult to be applied in actual monitoring. To solve the above problems, according to the high precision geocoding method for a ground-based synthetic aperture radar image provided in the present disclosure, through geocoding processing of step 1 to step 4, geometric mapping registration may be performed on radar two-dimensional imaging information and topographic data of various application scenarios, such as monitoring scenarios of open-pit mines, landslides, dams, and buildings to achieve mutual transformation between a two-dimensional polar coordinate system of radar and a spatial three-dimensional point cloud coordinate system and determine spatial position information of deformation of a unique side slope ground object target in the radar resolution unit (m, n), thereby more intuitively and clearly reflecting a deformation development situation in the monitoring area of a side slope.

Moreover, the radar time sequence deformation data is directly input into a model for analyzing according to a traditional early warning and forecasting idea, which ignores a problem that the adaptability between time sequence deformation data and the classical and empirical early warning and forecasting model is reduced due to a change of an incident angle of the radar. According to the present disclosure, through step 5 to step 9, the radar line-of-sight direction vector OP and the side slope sliding vector $$S_m^n$$

of the radar resolution unit (m, n) are obtained according to the spatial point cloud information first, then the projection transformation parameter $$\gamma_m^n$$

of the radar resolution unit (m,n) is determined, and finally, the processed major sliding deformation component $$dis_m^n$$

of the side slope is applied to an early warning and forecasting model, which helps to improve the accuracy of recognizing a side slope hidden peril deformation body and improve the work efficiency of a ground-based interferometric synthetic aperture radar monitoring and early warning system.

Embodiment 2

A computer device includes a memory, a processor, and a computer program that is stored on the memory and is executable by the processor. The processor executes the computer program to implement steps of the high precision geocoding method for a ground-based synthetic aperture radar image in Embodiment 1.

Embodiment 3

A computer-readable storage medium stores a computer program. Steps of the high precision geocoding method for a ground-based synthetic aperture radar image in Embodiment 1 are implemented when the computer program is executed by a processor.

Embodiment 4

A computer program product includes a computer program. Steps of the high precision geocoding method for a ground-based synthetic aperture radar image in Embodiment 1 are implemented when the computer program is executed by a processor.

Embodiment 5

A computer device is provided. The computer device may be a database. The computer device includes a processor, a memory, an Input/Output (called I/O for short) interface, and a communication interface. The processor, the memory, and the I/O interface are connected with each other through a system bus. The communication interface is connected to the system bus through the I/O interface. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store transactions to be processed. The I/O interface of the computer device is configured to exchange information between the processor and an external device. The communication interface of the computer device is configured to connect and communicate with an external terminal through a network. The high precision geocoding method for a ground-based synthetic aperture radar image in Embodiment 1 is implemented when the computer program is executed by the processor.

It is to be noted that, object information (including, but not limited to, object device information, object personal information, and the like) and data (including, but not limited to, data used for analyzing, data used for storage, data used for displaying, and the like) involved in the present disclosure are both the information and data authorized by object user or all parties, and collection, use, and processing and relevant data have to comply with relevant laws, regulations, and standards of relevant countries and regions.

Those skilled in the art can understand that all or part of the processes in the above method embodiments may be implemented by a computer program to instruct related hardware, and the computer program may be stored in a non-volatile computer-readable storage medium. When the computer program is executed, the flow of each method embodiment as described above may be included. Any reference to a memory, a database, or other media used in various embodiments provided in the present disclosure may include at least one of a non-volatile memory and a volatile memory. The non-volatile memory may include a Read-Only Memory (ROM), a magnetic tape, a floppy disk, a flash memory, an optical memory, a high-density embedded non-volatile memory, a resistive Random Access Memory (ReRAM), a Magnetoresistive Random Access Memory (MRAM), a Ferroelectric Random Access Memory (FRAM), a Phase Change Memory (PCM), a graphene memory, and the like. The volatile memory may include a Random Access Memory (RAM) or an external cache memory. By way of illustration but not limitation, the RAM may be in a variety of forms such as a Static Random Access Memory (SRAM) or a Dynamic Random Access Memory (DRAM). The database involved in various embodiments provided in the present disclosure may include at least one of a relational database or a non-relational database. The non-relational database may include, but is not limited to, a blockchain-based distributed database, and the like. The processor involved in various embodiments provided in the present disclosure may be, but is not limited to, a general-purpose processor, a central processing unit, a graphics processing unit, a digital signal processor, a programmable logic device, a quantum computing-based data processing logic device, and the like.

Technical features of the above embodiments may be randomly combined. For the sake of brevity of description, all possible combinations of the technical features in the above embodiments are not described. However, as long as there is no contradiction in the combination of these technical features, it is considered to be the range described in this specification.

Specific examples are used for describing a principle and implementations of the present disclosure herein. The description of the embodiments above is merely intended to help understand the method of the present disclosure and a core idea of the present disclosure. The same or similar parts between different embodiments may refer to each other. Meanwhile, those of ordinary skill in the art may make modifications to the specific implementations and a scope of application based on the idea of the present disclosure. In conclusion, the content of the present specification is not to be construed as a limitation to the present disclosure.

What is claimed is:

1. A geocoding method for a ground-based synthetic aperture radar image, comprising:

capturing, by a radar in a ground-based interferometric synthetic aperture radar monitoring and early warning system, a Single Look Complex (SLC) image of a monitoring area in a two-dimensional plane coordinate system, and preforming, by a processor in the ground-based interferometric synthetic aperture radar monitoring and early warning system, operations of:

dividing the SLC image in the two-dimensional plane coordinate system into a plurality of radar resolution units according to radar range resolution and radar azimuth resolution;

determining a radar line-of-sight direction vector, a slant range between a target and a radar, and a normalized vector in a horizontal direction of the radar according to spatial point cloud information of a side slope ground object target and a radar rectilinear orbit, and determining a reference plane normal vector according to a spatial geometric mapping relationship;

determining a coordinate parameter of a ground object point cloud target in a two-dimensional coordinate system of the radar based on the radar line-of-sight direction vector, the normalized vector in the horizontal direction of the radar, and the reference plane normal vector;

determining an angular coordinate in a radar polar coordinate system based on the coordinate parameter of the ground object point cloud target in the two-dimensional coordinate system of the radar;

determining a coordinate of the ground object point cloud target in the radar polar coordinate system based on the angular coordinate in the radar polar coordinate system and the slant range between the target and the radar;

obtaining ground object point cloud data based on the coordinate parameter of the ground object point cloud target in the two-dimensional coordinate system of the radar and the coordinate of the ground object point cloud target in the radar polar coordinate system;

screening the ground object point cloud data in a radar monitoring range according to actual monitoring parameters of the radar to determine a unique ground object point cloud target of a radar resolution unit, wherein the actual monitoring parameters of the radar comprises a maximum monitoring range, a minimum monitoring range, a maximum sine azimuth angle, and a minimum sine azimuth angle;

performing radar resolution unit plane fitting and determining a plane normal vector based on the unique ground object point cloud target of the radar resolution unit;

determining a vector of intersection line of a fitted plane and a plane in a same spatial reference system;

determining a side slope sliding vector of each radar resolution unit based on the plane normal vector and the vector of the intersection line;

determining a projection transformation parameter of each radar resolution unit based on the radar line-of-sight direction vector and the side slope sliding vector;

determining a displacement component along a direction of the side slope sliding vector in each radar resolution unit based on the projection transformation parameter of each radar resolution unit and radar time sequence deformation data; and setting the displacement component along the direction of the side slope sliding vector in each radar resolution unit as pre-processed ground-based interferometric synthetic aperture radar deformation data;

inputting the pre-processed ground-based interferometric synthetic aperture radar deformation data into an existing early warning and forecasting model in the ground-based interferometric synthetic aperture radar monitoring and early warning system for a deformation stage of a side slope in the monitoring area, and outputting an early warning level and forecasting information of the side slope.

2. The method according to claim 1, wherein the coordinate parameter of the ground object point cloud target in the two-dimensional coordinate system of the radar is expressed as $(x_P, y_P)$, wherein $x_P=\langle OP, L\rangle$ and $y_P=\langle OP, L_y\rangle$, $x_P$ denotes an x-coordinate of the ground object point cloud target in the two-dimensional coordinate system of the radar, $y_P$ denotes a y-coordinate of the ground object point cloud target in the two-dimensional coordinate system of the radar, OP denotes the radar line-of-sight direction vector, $L_x$ denotes the normalized vector in the horizontal direction of the radar, and $L_y$ denotes the reference plane normal vector.

3. The method according to claim 2, wherein the angular coordinate in the radar polar coordinate system is expressed as θ, $$\theta = \begin{cases} \arctan\dfrac{x_P}{y_P}, & y_P \neq 0 \\ 0, & y_P = 0 \end{cases}.$$

4. The method according to claim 1, wherein the screening the ground object point cloud data in a radar monitoring range according to actual monitoring parameters of the radar to determine a unique ground object point cloud target of a radar resolution unit comprises:

determining whether each radar resolution unit only contains one piece of ground object point cloud data;

in a case that each radar resolution unit only contains one piece of ground object point cloud data, setting the ground object point cloud data as the unique ground object point cloud target; and in a case that each radar resolution unit contains a plurality of pieces of ground object point cloud data, setting an average value of the plurality of pieces of ground object point cloud data as the unique ground object point cloud target.

5. The method according to claim 1, wherein the vector of intersection line is expressed as $$L_m^n,$$

$$L_m^n = P_m^n \cap P_{XOY},$$

wherein $$P_m^n$$

denotes a plane fitted with the ground object point cloud data corresponding to a radar resolution unit (m, n) as a center, and $P_{XOY}$ denotes an XOY plane that is located in a same spatial reference coordinate system as the fitted plane.

6. The method according to claim 5, wherein the side slope sliding vector is expressed as $$S_m^n,$$

$$S_m^n = I_m^n \times L_m^n,$$

wherein $$I_m^n$$

denotes a normal vector of a plane $$P_m^n.$$

7. The method according to claim 6, wherein the projection transformation parameter is expressed as $$\gamma_m^n,$$

$$\gamma_m^n = \frac{\langle OP, S_m^n \rangle}{|OP| \cdot |S_m^n|},$$

wherein OP denotes the radar line-of-sight direction vector.

8. The method according to claim 7, wherein the displacement component along the direction of the side slope sliding vector in the radar resolution unit is expressed as $$dis_m^n,$$

$$dis_m^n = \gamma_m^n \times diff_m^n,$$

wherein $$diff_m^n$$

denotes the radar time sequence deformation data.

* * * * *